United States Patent [19]

Barton et al.

[11] Patent Number: 4,951,288
[45] Date of Patent: Aug. 21, 1990

[54] APPARATUS FOR PROTECTING A LASER

[75] Inventors: Udo Barton; Gerhard Ruf, both of Munich; Fritz Wondrazek, Pfaffenhofen, all of Fed. Rep. of Germany

[73] Assignee: Messerschmitt-Boelkow-Blohm GmbH, Munich, Fed. Rep. of Germany

[21] Appl. No.: 399,262

[22] Filed: Aug. 28, 1989

[30] Foreign Application Priority Data

Sep. 7, 1988 [DE] Fed. Rep. of Germany ....... 3830360

[51] Int. Cl.$^5$ ............................................... H01S 3/10
[52] U.S. Cl. ........................................ 372/33; 372/98; 372/109
[58] Field of Search ...................... 372/98, 109, 33, 14, 372/103

[56] References Cited

U.S. PATENT DOCUMENTS 4,087,766  5/1978  Mohler ................................... 372/98
4,718,071  1/1988  Steffan ................................... 372/33

FOREIGN PATENT DOCUMENTS 3031908  3/1982  Fed. Rep. of Germany .

Primary Examiner—James W. Davie
Attorney, Agent, or Firm—W. G. Fasse; D. H. Kane, Jr.

[57] ABSTRACT

Sensitive components of a laser such as a resonator mirror, a decoupling mirror or the like, are protected against an initial laser beam surge caused by the ignition of a laser with an arc discharge lamp, by a beam interrupting switch having two switch sections each carrying a filter or shutter switchable into a laser beam path in response to an arc discharge lamp ignition pulse. For a beam interruption the filters or shutters are located directly in front of and directly behind of a lasing element as viewed in the beam path direction. The switch sections are operated by a shifting mechanism responsive to the ignition pulse to bring the switch sections into the beam path and to a control signal to bring the switch sections out of the beam path or into a beam releasing position.

14 Claims, 1 Drawing Sheet

4,951,288

APPARATUS FOR PROTECTING A LASER

CROSS-REFERENCE TO RELATED APPLICATION

The present application relates to copending patent application entitled: ELECTROMAGNETIC BEAM SWITCH ESPECIALLY FOR LASER RESONATORS, U.S. Ser. No. 399,267, filed on Aug. 28, 1989.

FIELD OF THE INVENTION

The invention relates to an apparatus for protecting sensitive components in a laser resonator or laser generator. A laser beam switch is used for this purpose.

BACKGROUND INFORMATION

German Patent Publication (DE-PS) No. 3,031,908 discloses a failsafe beam switch with filters and/or shutters which are brought into or out of the path of an electromagnetic radiation by means of an electromagnetic switching mechanism. The beam path may, particularly be that of a laser resonator or generator and the filter and/or shutters may be tilted into the path, whereby two filter systems or two shutter systems which are independent of one another are arranged in series one behind the other. Each filter or shutter system has its own sensor to check the instantaneous position of the respective system. The sensors are so arranged that the individual sensors control each other. The mutual checking makes sure that a failsafe radiation switch is provided which even if certain switch components have failed, still provides a safe protection against an undesired exit of the laser radiation. The known beam switch is constructed for providing protection against an undesired exit of a radiation, especially a laser radiation. The known switch is not particularly constructed for protecting sensitive components within a laser resonator or laser generator.

OBJECTS OF THE INVENTION

In view of the foregoing it is the aim of the invention to achieve the following objects singly or in combination:

to construct a beam switch, especially a laser beam switch capable of protecting sensitive components within a laser resonator or generator against damage or even destruction by the ignition impulse which has a high intensity;

to provide such protection in a simple manner and with as little effort and expense as possible;

to provide a beam switch having several sections capable of being operated in synchronism with each other; and to protect sensitive components such as a resonator mirror, a decoupling mirror, or the like in a laser against an initial surge or peak power when the laser is switched on.

SUMMARY OF THE INVENTION

The protecting apparatus according to the invention for protecting sensitive components in a laser such as a reflector mirror or a decoupling mirror, is characterized in that a beam switch is divided into two sections in such a manner that upstream and downstream of a lasing medium a switch section is positionable by means of a shifting mechanism. The switch sections in their beam interrupting position are further located in front of reflecting surfaces of a laser resonator or generator. These reflecting surfaces are the sensitive components that require protection against an initial laser beam surge. After the initial beam surge has subsided, the beam switch sections are again removed from the beam path.

Mechanisms for operating the beam switch sections are disclosed in the above mentioned German Patent Publication and in the above mentioned copending U.S. Pat. application Ser. No. 399,267, filed on Aug. 28, 1989.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
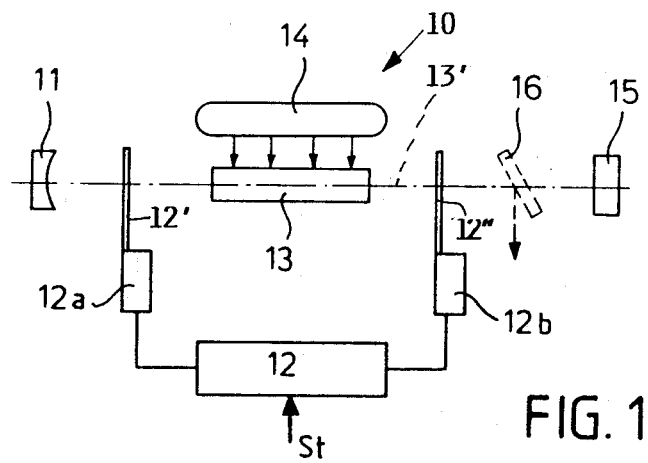
FIG. 1 is a schematic illustration of a beam switch according to the invention equipped with shutters for the beam interruption.

As shown in FIG. 1, the laser 10 which is preferably a continuous wave laser, comprises a resonating mirror 11, a lasing crystal 13, an arc discharge lamp 14, and a decoupling mirror 15. These components form a laser generator or resonator which may also include internal reflecting surfaces 16. At the time of ignition of the arc discharge lamp 14 serving for the so-called pumping of the solid state laser preferably in a continuous wave operation, a light impulse of high intensity is produced which in turn causes a laser impulse having an undesired high initial surge power. This laser impulse is produced not only between the mirrors 11 and 15 of the laser resonator, but also between the lasing crystal 13 and any reflecting mirrors such as 16 inside the resonator. The initial beam surge has a sufficiently high intensity that it could cause the destruction of these components located inside the resonator. It is the purpose of the invention to protect these sensitive components against damage or destruction by the initial laser beam surge.

The invention accomplishes this purpose by a beam switch 12 controlled by a starting impulse St that also triggers the arc discharge lamp 14. The beam switch 12 is so divided into two beam switch sections 12a and 12b that shutters 12' and 12" are positionable into the beam path 13' in response to the ignition impulse St. The shutters 12' and 12" are located directly downstream and directly upstream of the lasing crystal 13 as viewed with regard to the beam path. Thus, the shutters 12' and 12" are also located in front of the respective sensitive components. More specifically the shutter 12' is located in front of the reflecting resonator mirror 11 and the shutter 12" is located in front of the reflecting surface 16. These shutters 12' and 12" can be shifted out of the beam path 13' by an appropriate control of the beam switch 12 by conventional means. This arrangement of the shutters 12', 12" has especially in connection with a continuous wave laser, the advantage that the continuous wave mirrors are protected against an excessive radiation so that they cannot be damaged or destroyed. Another advantage resides in the fact that a triggering of the laser crystal 13 between the mirror surfaces and thus an exit of an undesired laser beam is prevented. Once the initial surge has passed, the switch 12 or rather the shutters 12', 12" of the respective switch sections 12a, 12b will be removed from the beam path. The shutters 12', 12" are so constructed that they are capable of substantially completel suppressing or eliminating the initial laser impulse or surge.

Figure 2:
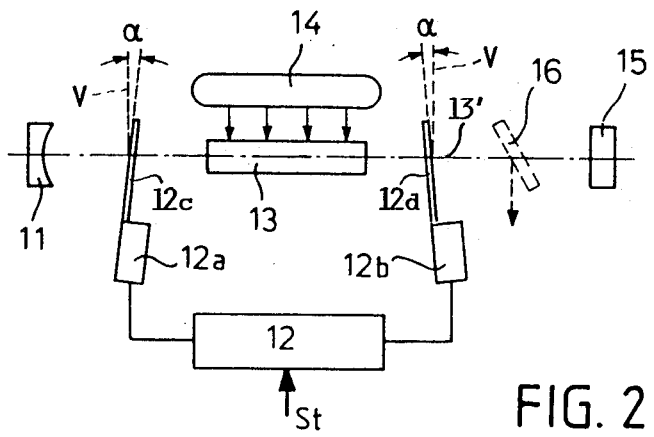
FIG. 2 is a view similar to that of FIG. 1, but showing a beam switch with filter plates for the beam interruption.

In the embodiment of FIG. 2, the switch sections 12a, 12b carry filter plates 12c and 12d respectively. In their effective position in the beam path 13' the filter plates 12c and 12d are slightly tilted relative to the direction of the beam path 13' by an angle $\alpha$ measured relative to a line V extending perpendicularly to the beam path 13'. The filter plates 12c and 12d are also located immediately in front of and behind the lasing crystal 13 as viewed relative to the beam path 13'. When the filter plates 12c, 12d are tilted as shown and described, the laser crystal 13 will not be triggered.

The beam switch 12 and thus its switch sections 12a and 12b can be controlled in any desired manner, for example, by a mechanical drive, an electrical drive, or a magnetic or electromagnetic drive or combinations thereof. Under certain circumstances it may be desirable to bring the shutters or filters into the beam interrupting position by controlling the beam switch sections 12a and 12b so that they are in the beam interrupting position prior to the ignition of the arc discharge lamp 14. If desired, the beam switches may be introduced into the beam path upon completion of a laser generation so that they are ready for performing the protecting function when the next laser beam generation begins to interrupt the initial beam surge. The duration of the presence of the shutters and/or filters in the beam path may be controlled by the duration of the ignition pulse St for the arc discharge lamp 14 so that upon completion of the ignition impulse, the shutters or filters are shifted out of the beam path. Such shifting may be accomplished by a linear or rotational movement or even with the aid of a piezocrystal which may determine the angle $\alpha$.

Although the invention has been described with reference to specific example embodiments it will be appreciated that it is intended to cover all modifications and equivalents within the scope of the appended claims.

What we claim is:

1. An apparatus for protecting sensitive components in a laser, comprising failsafe beam switch means for interrupting a laser beam, said failsafe beam switch means comprising at least two beam switch sections movable back and forth between a beam interrupting position in a beam path and a beam releasing position, and means for shifting in unison said beam switch sections from one of said positions into the other and vice versa, one of said beam switch sections being located in said beam interrupting position between a lasing element and a first sensitive component of said laser, and wherein the other of said beam switch sections is located in said beam interrupting position between said lasing element and a second sensitive component of said laser, and wherein each of said beam switch sections carries a shutter for interrupting said laser beam, said shutters being located in said beam path directly in front of and directly behind said lasing element when said shutters are in said beam interrupting position for protecting said sensitive components against an initial laser beam surge.

2. The apparatus of claim 1 wherein said means for shifting said beam switch sections are responsive to an ignition impulse of said laser for shifting said beam switch sections into said beam path simultaneously with an ignition of said laser to prevent an initial peak laser beam power from reaching said sensitive components.

3. The apparatus of claim 1, wherein said means for shifting comprise mechanical means controllable by a respective control unit for shifting said beam switch sections back and forth between said positions in and out of said beam path.

4. The apparatus of claim 1, wherein said means for shifting comprise electrical means controllable by a respective control unit for shifting said beam switch sections back and forth between said positions in and out of said beam path.

5. The apparatus of claim 1, wherein said means for shifting comprise magnetic means controllable by a respective control unit for shifting said beam switch sections back and forth between said positions in and out of said beam path.

6. The apparatus of claim 1, wherein said means for shifting comprise electromagnetic means controllable by a respective control unit for shifting said beam switch sections back and forth between said positions in and out of said beam path.

7. The apparatus of claim 1, wherein said beam releasing position of said beam switch sections is outside said beam path.

8. An apparatus for protecting sensitive components in a laser, comprising failsafe beam switch means for interrupting a lesser beam, said failsafe beam switch means comprising at least two beam switch sections movable back and forth between a beam interrupting position in a beam path and a beam releasing position, and means for shifting in unison said beam switch sections from one of said positions into the other and vice versa, one of said beam switch sections being located in said beam interrupting position between a lasing element and a first sensitive component of said laser, and wherein the other of said beam switch sections is located in said beam interrupting position between said lasing element and a second sensitive component of said laser, and wherein each of said beam switch sections carries a filter means for interrupting a laser beam, said filter means being located in said beam path directly in front of and directly behind said lasing element when said filters are in said beam interrupting position for protecting said sensitive components against an initial laser beam surge.

9. The apparatus of claim 8, wherein each of said filter means comprises a filter plate carried by its respective means for shifting in such a manner that in a first beam passing position each filter plate extends perpendicularly to said beam path and so that in a second beam interrupting position each filter plate extends at an angle $\alpha$ formed between said filter plate and a line extending perpendicularly to said beam path when said filter plate is in said second beam interrupting position.

10. The apparatus of claim 8, wherein said means for shifting said beam switch sections are responsive to an ignition impulse of said laser for shifting said beam switch sections into said beam path simultaneously with an ignition of said laser to prevent an initial peak laser beam power from reaching said sensitive components.

11. The apparatus of claim 9, wherein said means for shifting comprise mechanical means and control means for operating said mechaincal means for shifting said filter plates back and forth between said first and second positions.

12. The apparatus of claim 9, wherein said means for shifting comprise electrical means and control means for operating said electrical means for shifting said filter plates back and forth between said first and second positions.

13. The apparatus of claim 9, wherein said means for shifting comprise magnetic means and control means for operating said magnetic means for shifting said filter plates back and forth between said first and second positions.

14. The apparatus of claim 9, wherein said means for shifting comprise electromagnetic means, and control means for operating said electromagnetic means for shifting said filter plates back and forth between said first and second positions.

* * * * *

UNITED STATES PATENT AND TRADEMARK OFFICE
CERTIFICATE OF CORRECTION

PATENT NO. : 4,951,288

DATED : August 21, 1990

INVENTOR(S) : Udo Barton et al.

It is certified that error appears in the above-identified patent and that said Letters Patent is hereby corrected as shown below:

Claim 8, line 3, Column 4, line 29, replace "lesser" by --laser--.

Signed and Sealed this

Seventh Day of January, 1992

Attest:

HARRY F. MANBECK, JR.

*Attesting Officer*  *Commissioner of Patents and Trademarks*